TROPENYL CARBINOLS

Christoph J. Grundmann and Gerhard Ottmann, Columbus, Ohio, assignors to Olin Mathieson Chemical Corporation, a corporation of Virginia No Drawing. Application July 26, 1955, Serial No. 524,589

3 Claims. (Cl. 260—292)

The present invention relates to compounds which may be represented by the following formula:

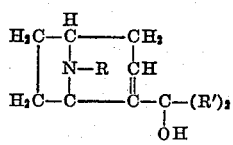

where R represents hydrogen, lower alkyl or cycloalkyl groups such as methyl, ethyl, propyl, butyl, cyclopentyl, n-hexyl, cyclohexyl, etc. and R' represents lower alkyl, including cycloalkyl and aralkyl groups, such as methyl, ethyl, propyl, cyclohexyl, benzyl, etc., and aryl groups such as phenyl, naphthyl, etc. and substituted derivatives thereof. In our co-pending application Serial No. 524,590, filed July 26, 1955, we have described an improved method of converting cycloheptatriene-carboxylic acid to a compound having the bicyclic tropane ring system which comprises the reaction of the cycloheptatriene compound with the $RNH_2$ primary amine compound. In the process of the present invention the carboxy substituted intermediates produced by the process of the co-pending application are reacted with metallo-organic compounds to produce the desired R' substituted carbinols. The following examples will serve to illustrate the invention.

EXAMPLE I

Diphenyl-tropenyl-carbinol

A solution of 10 g. anhydro-ecgonine-methyl-ester in 30 ml. of ether was added dropwise during 30 minutes under stirring and in an atmosphere of nitrogen at −20° to an ethereal lithiumphenyl solution prepared from 1.85 g. lithium and 23 g. bromo-benzene in 75 ml. of ether. The reaction mixture was then kept for another 2½ hours at −20°, allowed to warm up to 0°, and slowly decomposed by addition of water. Most of the carbinol separates as a solid layer between the ethereal and aqueous phases. Evaporation of the ethereal phase and storing of the oily residue in the refrigerator until crystallization is complete gives a total yield of about 81 percent. The crude product still containing inorganic impurities is recrystallized twice from absolute ethanol with addition of charcoal. After sublimation at 150° (bath temperature) and 1 mm. pressure, the desired product melts at 190°. In this example, R is methyl and R' is phenyl.

EXAMPLE II

Diphenyl-tropenyl-carbinol-methiodide

To a suspension of 2 g. of diphenyl-tropenyl-carbinol in 75 ml. anhydrous ether, 5 ml. iodomethane is added and the mixture is stirred for 24 hours at room temperature. Then the resulting precipitate is filtered off and washed with 500 ml. anhydrous ether. The light-yellow methiodide is obtained in a yield of 94 percent. M. P. 246° uncorr.

EXAMPLE III

Dimethyl-tropenyl-carbinol 10.73 g. of anhydro-ecgonine-ethylester in 20 ml. of ether is added dropwise with stirring to a Grignard-solution formed from 3.52 g. of magnesium and 18.8 g. of methyliodide in 90 ml. of ether. The reaction takes place at room temperature and is finished within 5 hours. After 50–60 ml. of water is added, the solution is filtered off from magnesium hydroxide and concentrated to dryness in vacuo. The residue, a brown highly viscous oil, is dissolved in 50 ml. of water, the solution is supersaturated with potassium carbonate and then extracted with ether. The ether is evaporated and the desired carbinol is distilled in vacuo yielding a colorless liquid. B. P. 75°/0.7 mm. Hg; $n_D^{22°}=1.4835$. In this example R and R' are both methyl.

EXAMPLE IV

Dimethyl-tropenyl-carbinol-methiodide

To 1.66 g. of tropenyl-dimethyl-carbinol in 15 ml. of ether 2 ml. of methyliodide is added. After standing for 24 hours, the methiodide is filtered off and recrystallized from absolute ethanol yielding white crystals, M. P. 231° C.

In a similar manner to the processes described above, other R and R' substituted products can be prepared. For example, compounds where R is hydrogen or amino can be readily prepared in accordance with Examples I and III by the substitution of noranhydro-ecgonine or N-amino-noranhydro-ecgonine for the anhydro-ecgonine employed in these examples. Similarly, other R' substituted compounds can be readily prepared by use of other lithium-aryl or aralkyl compounds or Grignard reagent for the lithium compound or Grignard reagent employed in Examples I and III. For example, other compounds where R' is lower alkyl or cycloalkyl can be readily prepared by employing the proper magnesium alkyl or cycloalkyl halide Grignard reagent. The methiodide derivatives described above are merely illustrative as the tertiary bases readily form quaternary halides with various alkyl halides.

The compounds of the present invention possess about one-tenth the activity of atropine and can be used in the same dosage form as atropine, the concentrations being adjusted to the potency desired. For example, they can be used to advantage where mild atropine activity is required. The compounds of the present invention can also be used in combination with atropine where atropine activity of varying potencies is desired. The tertiary carbinols of the present invention are also relatively stable and are satisfactory for use in the pharmaceutical field. In this they differ materially from the primary tropenyl carbinol (where R' is hydrogen) which is relatively unstable decomposing readily in air.

We claim:

1. A tropenyl carbinol represented by the following formula:

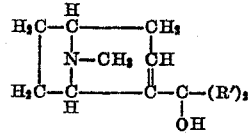

where R' represents a member selected from the class consisting of lower alkyl and phenyl groups.

2. A compound in accordance with claim 1 where R' represents a phenyl group.

3. A compound in accordance with claim 1 where R' represents a methyl group.

No references cited.